April 19, 1938.    K. URQUHART    2,114,789
DOUBLE SEATED VALVE
Filed Aug. 16, 1935    4 Sheets-Sheet 1
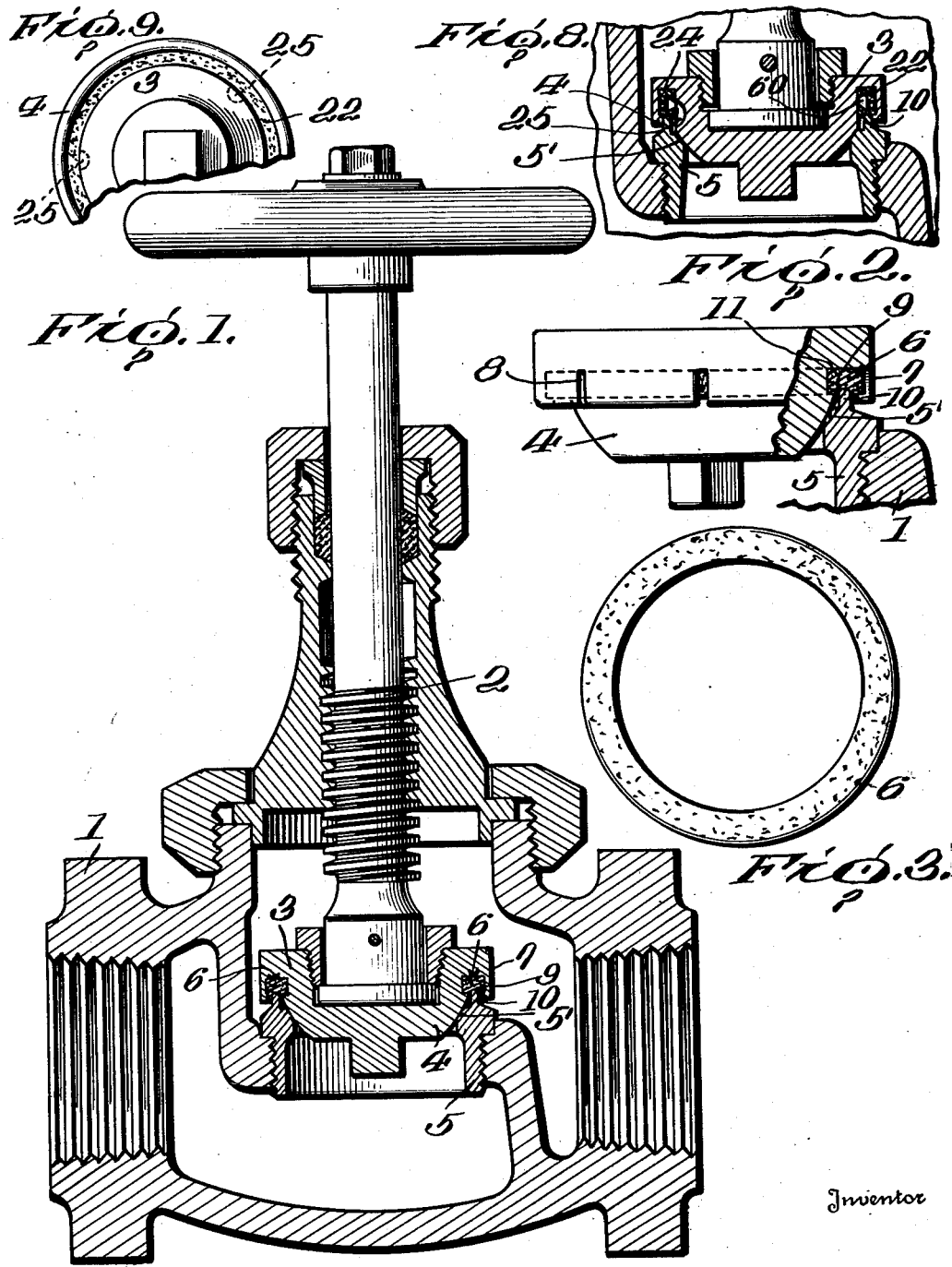
Inventor
KENNETH URQUHART
By Percy H Moore
Attorney

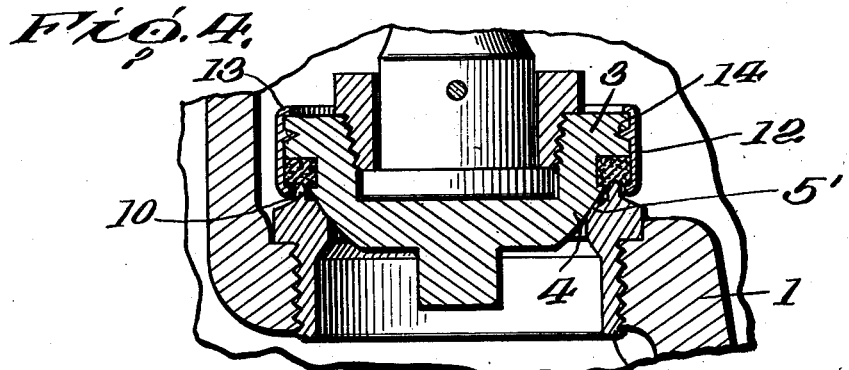
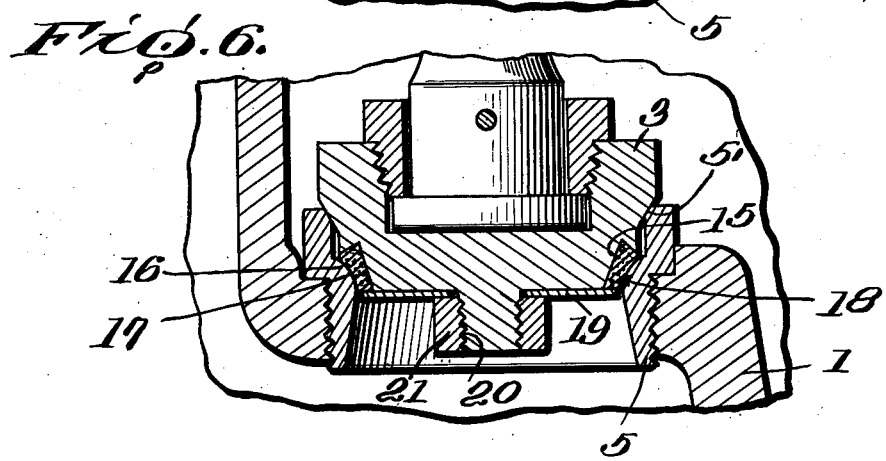
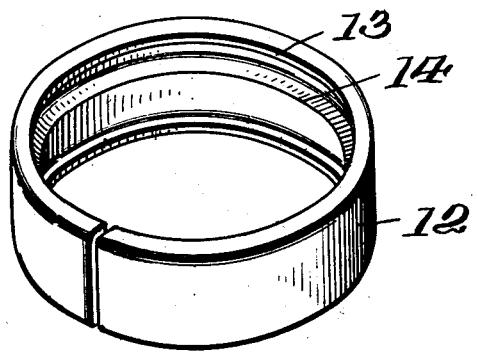

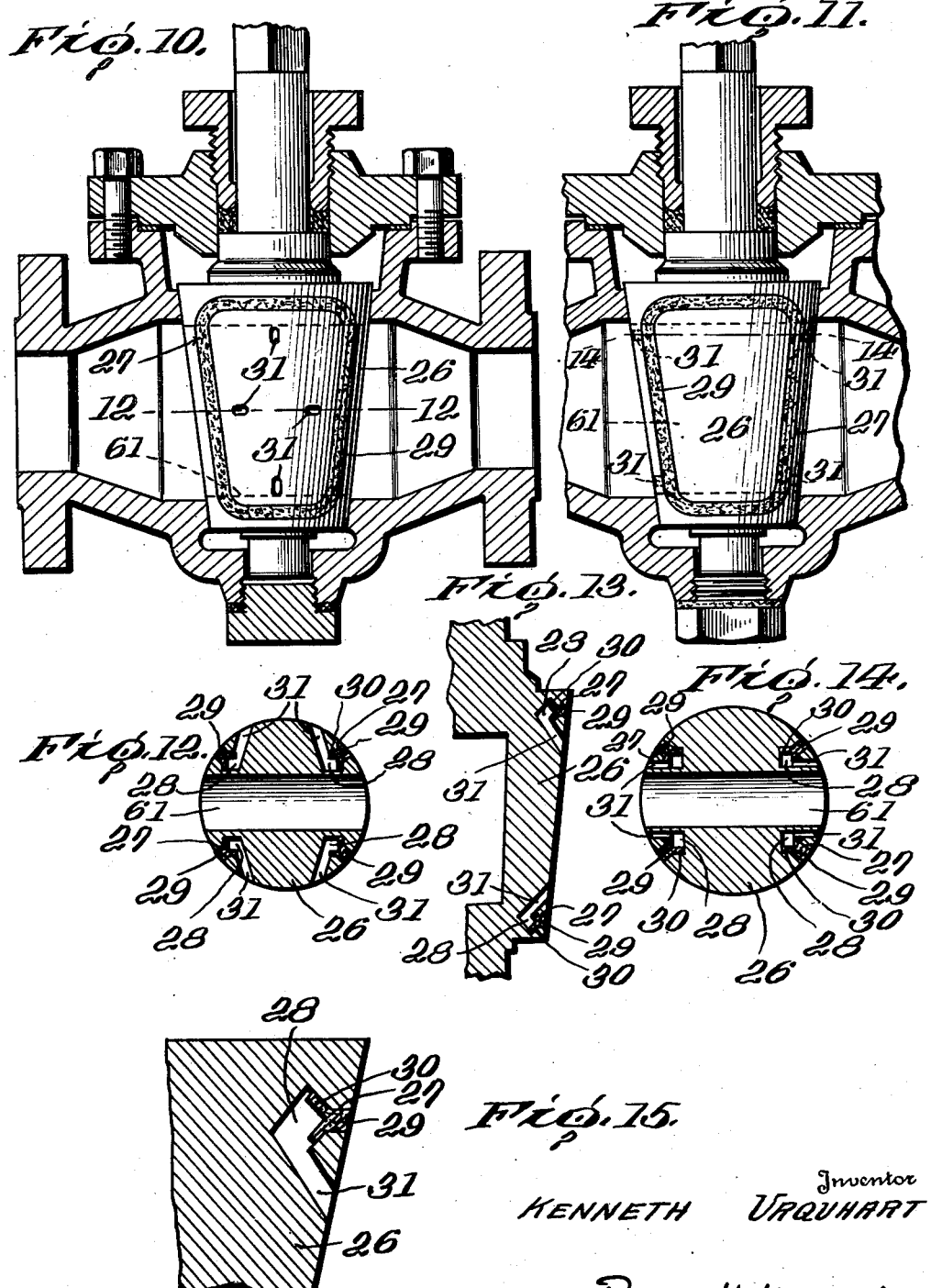

April 19, 1938. K. URQUHART 2,114,789
DOUBLE SEATED VALVE
Filed Aug. 16, 1935  4 Sheets-Sheet 4
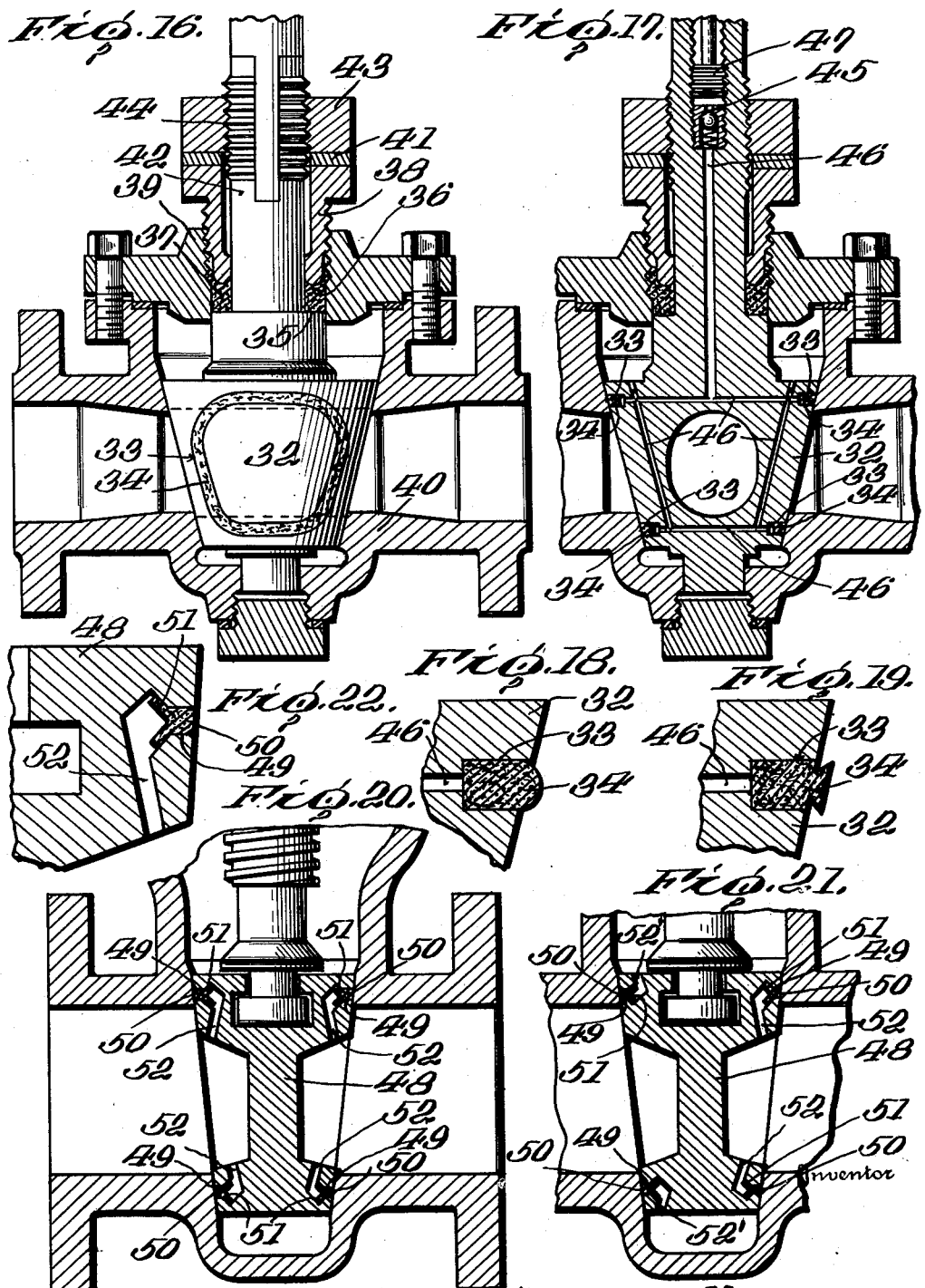

Patented Apr. 19, 1938

2,114,789

UNITED STATES PATENT OFFICE 2,114,789

DOUBLE SEATED VALVE

Kenneth Urquhart, Norfolk, Va.

Application August 16, 1935, Serial No. 36,573

1 Claim. (Cl. 251—28)

My invention relates to a multiple seal valve adapted for handling corrosive hydrocarbons and other fluids.

Heretofore it has been the practice to employ single seated valves in which the packing ring was embedded or made a part of the valve disc or valve seat. These valves have proved unsatisfactory in that a certain amount of leakage occurred when the valve disk or seat became corroded or otherwise worn.

The principal object of my invention is to provide a double seated valve wherein the metal valve plug is adapted to seat against the metal valve seat, and a resilient packing ring located in the valve plug, is adapted to seat against the surface of the valve seat, thereby producing a double sealing effect.

Another object is to provide a metal sealing valve having an auxiliary sealing means, whereby the valve may be shut off tightly even when the metal surfaces become corroded or pitted.

Another object is to provide a valve having a readily replaceable packing member therein, which packing member overcomes the heretofore necessary expedient of replacing expensive alloy seats and plugs upon slight corrosion or pitting thereof.

A further object is to provide packing means in a valve whereby loss occasioned by leakage and fire is reduced to a minimum.

A further object is to provide a comparatively inexpensive and easily assembled valve structure.

These and other objects will be apparent when the specification is considered with the accompanying drawings, in which:

Figure 1 is a vertical sectional view of a valve embodying my invention;

Figure 2 is an enlarged side elevation of the valve plug partly in section, showing the resilient packing retaining means;

Figure 3 is a plan view of the packing ring;

Figure 4 is a vertical sectional view of a modified form of the packing ring retaining means;

Figure 5 is a detached perspective view of the packing ring retaining means, shown in Figure 4 of the drawings;

Figure 6 is a vertical sectional view of a further modified form of the packing ring and its retaining ring;

Figure 7 is a sectional view of the packing ring shown in Figure 6;

Figure 8 is a vertical sectional view of a modified form of the packing ring;

Figure 9 is a bottom plan view of the valve plug shown in Figure 8;

Figure 10 is a vertical sectional view of a plug valve showing the fluid ducts on the inside of the packing ring;

Figure 11 is a vertical sectional view of the plug valve in open position showing the opposite side of the plug face from that shown in Figure 10;

Figure 12 is a section taken on the line 12—12 of Figure 10;

Figure 13 is a vertical cross section through a portion of the plug valve of Figure 10;

Figure 14 is a section through the line 14—14 of Figure 11;

Figure 15 is an enlarged cross section of the groove and pressure duct with the packing ring positioned therein;

Figure 16 is a vertical sectional view of a plug valve showing my compression packing ring;

Figure 17 is a vertical section of the plug valve showing the lubricating means therefor;

Figures 18 and 19 are cross sections through the compression packing rings;

Figure 20 is a vertical section of a gate valve embodying the invention;

Figure 21 is a similar view of a gate valve embodying a modified arrangement of pressure ducts; and Figure 22 is an enlarged cross section of the packing groove, packing and pressure ducts as applied to the gate valve.

Referring more particularly to Figures 1, 2 and 3 of the drawings, in which similar reference characters refer to like parts throughout the several views, numeral 1 denotes the body of a globe valve, or the like, having a threaded valve stem 2 inserted therethrough. A conical metal head 4 of a valve disc or plug 3, is adapted to seat upon a correspondingly conically shaped valve seat member 5, having a valve seat portion 5'. A substantially rectangularly shaped annular groove 6 is formed in the valve disc 3, adjacent the outside wall 7 thereof, the wall 7 being slotted, as at 8, to render it slightly flexible. The groove 6 is adapted to receive a resilient packing ring 9, of rubber or the like, therein. When handling light hydrocarbons, I prefer to form my resilient packing ring of artificial rubber compounds or the like. The upper end of the seat member 5 is reduced thereby forming a substantially upstanding ridge or valve ring 10, which is adapted to extend into the groove 6 and seat against the resilient packing ring 9. The groove 6 is preferably undercut in the valve plug, as at 11, which undercut edges serve to position the packing ring therein.

It will be noted that the conical metal valve head 4 will frictionally engage the metal valve seat portion 5' and form a tight seal for the valve. Packing ring 9, having the valve ring 10 pressed thereagainst, serves to form a tight seal and prevents valve leakage when the valve plug or seat becomes pitted, corroded, or otherwise damaged.

When the valve is in closed position valve ring 10 will press against and spread the resilient packing ring 9, whereby the slotted retaining wall 7 of the groove will flex and allow for the spread of the packing ring, the relatively thin outer wall area opposite the groove 6 being sufficiently resilient for this purpose. Therefore, when leakage between metal valve head and metal seat occurs, the tight engagement of valve ring 10 with packing ring 9 forms a tight seal for the valve and prevents any leakage therefrom.

A modification of my invention is disclosed in Figures 4 and 5, wherein a removable resilient split retaining ring 12 is adapted to fit over the valve plug 4, a wedge-shaped tongue 13, or the like, being received in a substantially V-shaped groove 14 in the plug 4 serves to retain the ring in position on the plug. The resilient split ring 12 is adapted to flex when packing ring 9 is expanded thereagainst upon engagement of the valve ring 10 when the valve is in closed position.

A further modification of my invention is disclosed in Figures 6 and 7, wherein the side wall of valve disc or plug 3 is provided with an annular groove or recess 15, at the lower end thereof, which groove is adapted to receive a resilient packing band or ring 16 therein. The valve seat portion 5 is provided with a rounded inner face 17, below the conical metal seat portion 5', for engaging a slightly curved or rounded outer face 18 of the packing ring, when the valve is closed. A thin metal disk 19 is adapted to be received on a relatively short threaded stem 20 of the valve, a lock nut 21, threadedly engaging the stem 20, serves to retain the disk in position against the lower end of the valve plug, thereby clamping the packing ring firmly in the groove 15.

It will be noted that when the valve is in closed position the resilient packing ring will be forced against the rounded inner face 17 of the valve seat thereby serving as an absolute sealing shut-off for the valve. Should a slight spacing occur between the metal valve plug and metal seat 5', due to corrosion or wear, the resilient packing ring, located at a point below the metal seating, will spread or expand against the rounded face 17 and prevent leakage. This last modification is particularly adapted for use with gritty liquids or to serve where the valve is operated in partly closed or throttled position.

Another modification of my invention is disclosed in Figures 8 and 9 wherein a substantially C-shaped resilient packing ring 22, is adapted to fit into a substantially rectangularly shaped annular groove 24 formed in the valve disc 3. A plurality of fluid channels or ducts 25 are cut into the bottom side of the valve head 4 whereby when the valve is in closed seated position any fluid leaking past the metal valve head 4 and valve seat 5' of valve seat member 5 will pass through the fluid ducts into the substantially annular groove or channel 60 formed by reason of the C shape of the packing ring, and thereby press or force the outer surfaces of the packing against the walls of the groove 24 and valve ring 10 thus forming a tight seal. Therefore it will be noted that the sealing effect of packing ring 22 is not dependent upon mechanical force pressing it into tight engagement with valve ring 10.

The upper end of the valve ring 10 is spaced some distance from the metal valve seat 5' thus having an annular chamber 10' on the inside of the ring. The packing ring first establishes a seal and any gritty substance or material is caught in the annular chamber 10' and will not remain on the metal seat 5' and thus said seat is tightly closed and there would be no grit on the same to cut the seat upon the tight closing thereof.

Another modification disclosed in Figures 10 to 15 inclusive shows the application of the invention to plug valves. The conical valve plug 26 thereof is provided with two grooves 27 cut into the plug on opposite sides thereof, which grooves are arranged to substantially encircle the faces of the plug on either side of the fluid passage 61 through the valve. The grooves extend radially into the valve plug and the inner end thereof is diamond-shaped and enlarged, as at 28. A resilient packing ring 29 is provided with a substantially arrow-shaped or flared inner edge 30, which is adapted to be received in the groove whereby the flared edges of the ring will extend into and contact the undercut walls of the diamond shaped opening 28. A plurality of fluid pressure ducts or channels 31 are provided in the faces of the plug, preferably four in each face, and are positioned adjacent the packing grooves 27. These ducts radially extend at an angle into said plug and thereby communicate with the aforementioned diamond-shaped opening 28 of the packing groove.

When the valve is in closed position the outer ends of the fluid pressure ducts 31 on one side of the plug are directly exposed to the full pressure of the arrested fluid which pressure is communicated to the under side of the packing ring 29 and thereby forces or holds the flared inner ends of the ring against the undercut sides 28 of the groove, while the outer end of the ring is forced out against the inner conical wall of the valve body and thereby provides a tight seat. It will be noted that in the closed position one of the packing rings 29 extends completely around or forms a ring around the inlet port of the valve body and seals off said port whereby the packing ring on the opposite side of the plug is inactive and does not seal the outlet port as there is no fluid pressure to put into action.

If the plug 26 is rotatable only 90°, both packing rings 29 may be utilized for a double seal. In this case by referring to Figure 11, it will be noted that the communicating fluid ducts 31 for one ring are arranged so their outer ends are outside the packing ring 29, while the fluid ducts for the other ring remain the same. Therefore when the plug 26 is in closed position any fluid which may seep past the first packing ring 29 comes into contact with the openings of pressure ducts 31 whereby fluid pressure is communicated to the under or inner side of the packing ring 29 thus forcing the outer end of the ring out against the wall of the valve body. Therefore both packing rings are active in sealing off both ports.

A further modification is illustrated in Figures 16, 17, 18 and 19, wherein the sealing effect between the flexible packing rings of the valve plug and the valve body is effected by compression of the packing rings and not by pressure of the fluid.

The faces of the valve plug 32 are provided with two cut grooves 33 for the reception of flexible resilient packing rings 34. Each groove is adapted to surround or encircle the periphery of the plug faces on either side of the fluid channel therethrough. The outer edge of the packing rings project beyond the face of the plug and can only be forced into their respective grooves by compression. The outer edges or faces of the rings may be rounded, wedge shaped or otherwise formed, as shown in Figures 18 and 19.

The valve plug 32 is provided with a thrust shoulder 35 which, when the valve is assembled, projects up into and forms a bottom for a stuffing box or enlargement 36 wherein a suitable packing 37 is placed and held in position by a gland nut 38 threadedly engaging the valve bonnet 39. By screwing home the gland nut 38, the packing is compressed against the thrust shoulder 35 thus forcing the valve plug into the valve body 40. A lift washer 41 fits around the plug shaft 42 and rests on top of gland nut 38. A lift nut 43 threadedly engages a threaded section 44 of the shaft 42.

When the valve is in operation under pressure, the gland nut 38 is screwed down tight enough to prevent any leakage through the stuffing box 36. In order to close the valve the gland nut is loosened which causes the same to push up on the lift washer 41 and lift nut 43 thus raising the valve plug 32 out of engagement with the valve body 40. Therefore compression on the packing rings 34 is released and should the gland nut be loosened sufficiently, the packing rings are practically lifted out of engagement with the valve body. With the valve plug raised clear of the body, the plug may be easily rotated, by a suitable lever or the like not shown, until the plug is in closed position. In this position the solid portions of the plug block or close the inlet and outlet ports of the valve body. The gland nut 38 may now be screwed down which thus forces the valve plug into engagement with the valve body and thereby causes the packing rings to be tightly compressed against the valve body. Therefore it will be noted that each packing ring entirely surrounds an inlet or outlet part of the valve body and thus forms a double positive shut off.

To open the valve the lift nut is unscrewed which causes the whole plug to lift and at the same time the packing 37 is raised in its compressed state by the thrust shoulder. When the plug and packing rings are lifted enough to relieve the tight compression of the same with the valve body, the plug may be rotated as aforementioned.

If desired the plug may be provided with a conventional lubricating chamber 45 and drilled passage 46 communicating with the packing ring grooves 33 and the undersides of the packing rings. A grease screw 47 is adapted to force the grease into the passages.

A further modification showing the application of my invention to gate valves, is illustrated in Figures 20, 21 and 22, wherein a wedge-shape valve gate 48 is provided with two substantially rectangular annular grooves 49 one in each face thereof. The inner ends of the grooves are undercut to form diamond-shaped cross sections into which the flared inner ends 51 of flexible packing rings 50 are inserted. Fluid pressure ducts or channels 52 are provided in the upper and lower portions of the gate 48, which ducts communicate with the enlarged inner ends of grooves 49.

When the valve is in closed position, the fluid pressure ducts 52 on the side of the gate facing the arrested fluid flow, transmit the full pressure of the fluid to the flared inner ends of the packing positioned in the grooves 49 whereby the flared ends of said packing are firmly retained against the walls of the enlarged portion of the grooves and the outer end of the packing ring is forced out against the valve wall thereby forming a tight seal which extends completely around the inlet port of the valve. The packing ring on the opposite side of the gate, not being exposed to pressure of the arrested fluid, is inactive and does not seal the outlet port of the valve.

However if the direction of fluid flow is always in the same direction both packing rings may be brought into action simultaneously in a manner about to be described. In Figure 21 the fluid pressure ducts 49, on the side of the gate exposed to the fluid, are arranged as in Figure 20 whereas on the opposite side of the gate the ducts 52' are drilled into the upper and lower ends of the gate from the top and bottom surfaces thereof and then intersect the grooves 49 as previously described.

With this arrangement the fluid pressure on the face of the gate exposed to the fluid flow, is transmitted to the packing ring 50 as in the valve of Figure 22. Then if for any reason there should be any seepage past this packing ring around the inlet port, the fluid seeping around the top and bottom of the wedge or gate will build up pressure which is transmitted through fluid pressure ducts 52 to the underside of packing ring whereby the outer end thereof is forced against the valve wall thus forming a tight seal which extends completely around the outlet port of the valve.

While I have shown and described preferred embodiments of my invention, it is to be understood that the same are susceptible of modification in various particulars without departing from the spirit or scope of the invention or sacrificing any of its advantages.

Having thus described my invention, what I claim is:

In a multiple seal valve, a casing, a valve seat in said casing, a valve member adapted to be forced against said seat to make a tight joint therewith, a flange projecting outwardly and downwardly from the periphery of said valve member, so as to form with the outer surface of said valve member a semi-enclosed compartment, a relatively soft packing member in said compartment, an upwardly projecting rim on said seat disposed directly below and adapted to be contacted with said packing when said valve is closed, said rim being spaced from said valve member so as to form a grooved chamber above said joint and between said joint and said rim, and a passage in said valve member connecting said grooved space with said compartment, the arrangement being such that any fluid leaking past said joint will pass through said passage into said compartment forcing the packing therein into firm engagement with said rim.

KENNETH URQUHART.